United States Patent [19]

Gibbs et al.

[11] Patent Number: 4,701,261

[45] Date of Patent: Oct. 20, 1987

[54] PROCESS FOR THE SEPARATION OF METALS FROM AQUEOUS MEDIA

[75] Inventors: Dudley F. Gibbs, Healey, nr. Riding Mill; Marilyn E. Greenhalgh, Whickham; James H. P. Watson, St. Austell, all of England; Richard G. Yeo, Colinton, Scotland; Derek C. Ellwood, Winterbourne Stoke, nr. Salisbury, England

[73] Assignee: Bio Separation Limited, Hertfordshire, England

[21] Appl. No.: 810,593

[22] Filed: Dec. 19, 1985

[30] Foreign Application Priority Data

Dec. 19, 1984 [GB] United Kingdom ............... 8431990

[51] Int. Cl.⁴ .................... C02F 3/00; C12N 13/00
[52] U.S. Cl. .................... 210/606; 210/632; 210/695; 423/10; 435/173; 435/262
[58] Field of Search .......... 435/173, 261, 262; 210/601, 695, 606, 632, 631, 665, 912, 682; 423/10, 11, 12

[56] References Cited

U.S. PATENT DOCUMENTS

| | | | |
|---|---|---|---|
| 4,021,368 | 5/1977 | Nemec et al. | 210/685 |
| 4,067,821 | 1/1978 | Votapek et al. | 210/912 |
| 4,152,210 | 5/1979 | Robinson et al. | 435/173 |
| 4,263,403 | 4/1981 | Paschke et al. | 210/601 |
| 4,292,408 | 9/1981 | Zimmermann et al. | 435/173 |
| 4,293,333 | 10/1981 | Drobot | 210/601 |
| 4,293,334 | 10/1981 | Drobot et al. | 75/108 |
| 4,320,093 | 3/1982 | Volesky et al. | 210/682 |
| 4,508,625 | 4/1985 | Graham | 210/695 |
| 4,530,763 | 7/1985 | Clyde et al. | 210/611 |

OTHER PUBLICATIONS

Strandberg, G. W.; "Biosorption of Uranium, Radium, and Cesium", paper presented at a Notre Dame Univ. Symposium; May 24–26, 1982.
Brierly, C. L.; "Microbiological Mining" in *Scientific American*, vol. 247, (2), 1982, pp. 42–51.
Watson, J. H. P.; "Applications of and Improvements in High Gradient Magnetic Separation" in *Filtration and Separation*, vol. 16(1), 1979, pp. 70–72, 74–78.
*Chemical Abstracts*, vol. 98 (15), 1983, p. 328, abstract No. 131664r.
Watson, J. H. P.; "Magnetic Filtration" in *J. Appl. Physics*, vol. 44 (9), 1973, pp. 4209–4213.
Macaskie, L. E. et al., "Cadmium Accumulation by a Citrobacter sp." in *J. Gen. Microbiology*, (1984), 130, pp. 53–62.
Waston, J. H. P. et al.; "Single-Wire Magnetic Separation: A Diagnostic Tool for Mineral Processing"; *Mintek 50*, (1984), pp. 335–340.

*Primary Examiner*—Benoit Castel
*Attorney, Agent, or Firm*—Antonelli, Terry & Wands

[57] ABSTRACT

Paramagnetic metals are separated from aqueous media containing them in low concentration by first fixing the metals on bacterial yeast or other cells so as to render the cells magnetic, and then recovering the cells by a high gradient magnetic separation technique. The metal and the cells are contacted in the presence of a compound which is converted by the cells into a product which interacts with the metal and causes it to become bound to the cells. The process is particularly useful for removing low concentrations of highly toxic metals, e.g. uranium, from industrial effluents containing them.

7 Claims, 1 Drawing Figure

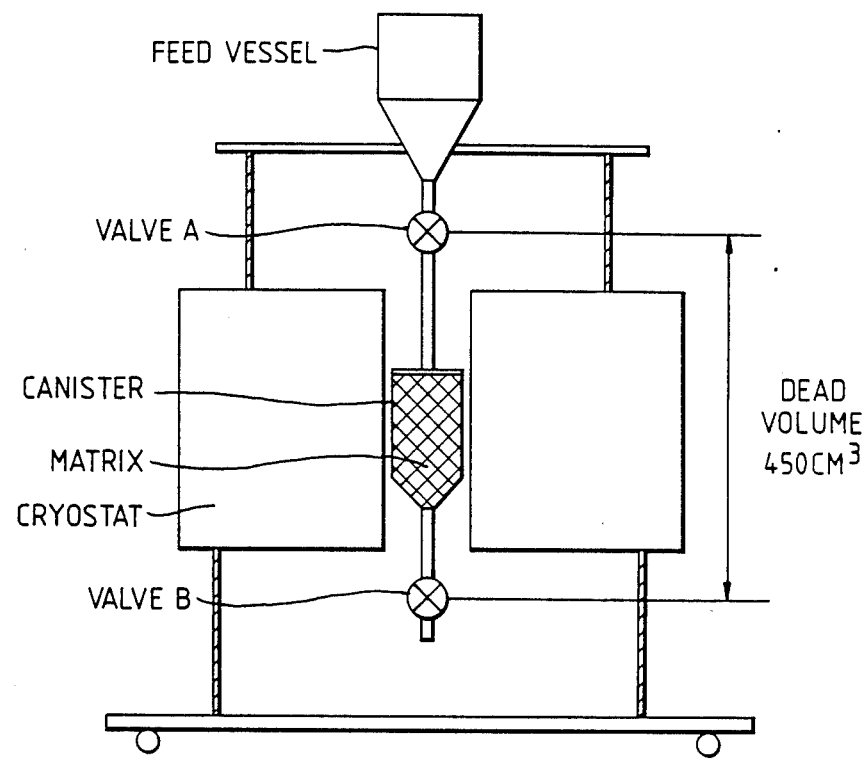

PROCESS FOR THE SEPARATION OF METALS FROM AQUEOUS MEDIA

This invention relates to the separation of metals from aqueous media.

It is frequently desirable to separate metals from aqueous media containing them. Not only is this the case where it is desired to obtain the metal in purified form, but also there are many cases where the metal is an undesired ingredient, for example for reasons of toxicity or radio-activity, in the medium which contains it, so that it is desirable to be able to remove all traces of the metal from the medium. It is thus often necessary, or at least highly desirable, to reduce the metal content of a given medium to a very low level. This is particularly true in the case of radio-active wastes which, if they are to be discharged into the ordinary environment, can be permitted to contain only infinitesimal amounts of contaminating radio-active metals.

A wide variety of processes have been proposed for separating metals, and particularly metal ions, from aqueous media containing them.

For example, in liquid membrane permeation, liquid ion exchange is used and the process combines extraction and stripping steps. It involves an emulsification step followed by a permeation step with subsequent settling and emulsion breaking. In solvent extraction, a variety of water-immiscible solvents have been used to recover valuable metals from dilute solutions. Typical of this approach is the use of methylisobutylketone to extract gold, iron and tellurium from feed liquor. The extracted metals are recovered directly from the organic phase by cementation, whilst the solvent is recovered for reuse by distillation. Macromolecular or colloidal particles have also been separated from liquids by ultrafiltration. If the metal to be removed is in solution, preliminary treatment has to be carried out to convert the metal into a precipitate or colloidal gel. In another method, metal ions in solution are treated with flocculating agents which bring about the precipitation of insoluble metal complexes which are subsequently recovered by filtration. However, none of these techniques are effective at very low concentrations of metal ion, i.e. less than 1%. In addition, they are costly both in terms of capital equipment and running costs.

The present invention is based upon the discovery that paramagnetic ions can be separated from aqueous media containing them with great efficiency if use is made of the ability of certain microorganisms to concentrate such ions.

According to the present invention, paramagnetic (including ferromagnetic) metals are separated from an aqueous medium containing them by contacting the said medium with cellular particles in the presence of a compound which is converted by the said particles into a product which interacts with the said metal and causes the said metal to become bound to the said particles, and then separating the said particles having the paramagnetic metal bound thereto magnetically from the aqueous medium.

The magnetic separation may be carried out by the high gradient magnetic separation technique which has been used for many years to retrieve magnetic and/or paramagnetic particulate matter from suspension, e.g. for removing iron-bearing particulate material from china clay slurry before processing, or for removing magnetite from waste streams. There are numerous descriptions of the process in the literature, see, e.g. J. H. P. Watson, "Magnetic Filtration", Journal of Applied Physics, 44, no 9 September 1973, pp 4209–4213, and "Applications of and improvements in High Gradient Magnetic Separation", Journal Filtration and Separation, 16, January–February 1979, pp 70–74. In high gradient magnetic separation a slurry or suspension, containing paramagnetic particles to be extracted, is passed through a matrix of fine ferromagnetic wire which is magnetized by an externally applied magnetic field. The paramagnetic particles are attracted to and held on the wires by magnetic forces. Eventually the efficiency of the trapping process becomes impaired by the accumulation of the captured particles. These trapped particles can then be released and the efficiency of the matrix restored by switching off the magnetic field and washing the particles from the matrix or by withdrawing the matrix from the magnetic field and washing the particles from the matrix. Thus high gradient magnetic separation is normally operated has a cyclical process with a collection phase and a washing phase. The technique of high gradient magnetic separation is particularly effective for particles having a diameter less than 50 $\mu$m where more conventional magnetic separators are ineffective. Although the effective force on a particle is proportional to the square of the particle radius, high gradient magnetic separators are capable of separating weekly paramagnetic particles of colloidal size. Known apparatus for use in high gradient magnetic separation is in general useful in the process of the present invention.

It is a particular advantage of the new process that it is capable of removing metals efficiently even though the concentration of the metal in the medium is very low, and in practice, the lower limit of the concentration to which the new process can be applied is fixed only by considerations of economy and the maximum permissible level of the said metal in the normal environment. The new process is believed to be applicable to media which may contain the metal to be separated in a concentration corresponding to only twice the solubility constant of the metal in the form in which it is bound to the cellular particles. Moreover, the new process may be effective where other, conventional separation methods have failed.

Any metal which forms paramagnetic ions may, in principle, be separated by the new process. Examples of such ions are niobium, iridium, osmium, palladium, platinum, rhenium, rhodium, rubidium, vanadium, lanthanides and actinides, uranium, chromium, cobalt, manganese, molybdenum, nickel, tungsten, and iron. The new process is particularly useful in removing uranium from aqueous wastes before they are discharged, e.g. from nuclear processing plant effluents. In such media, the uranium is normally present in the form of uranyl ions.

In the aqueous medium which may be treated in accordance with the new method, the paramagnetic metal may be present in dissolved form, in colloidal form, or in the form of aggregates which are too small themselves to be removed magnetically from the aqueous medium. Cellular particles, that is to say particles of a monocellular organism such as a bacterium or yeast, or individual plant or animal cells, have an appropriate size for separation from an aqueous medium by the high gradient magnetic separation technique, but are not normally magnetic. In the method of the prsent invention, the paramagnetic metal becomes bound to the cellular particles and the latter are thereby rendered magnetic and capable of being separated magnetically. This result is achieved by relying on the ability of cellular particles to bring about chemical changes, normally by the enzymes which they contain, in compounds which are brought into contact with the particles. The new process is operated by introducing into the aqueous medium containing the paramagnetic metal, a compound which is altered by the cellular particles and then interacts with the paramagnetic metal and causes it to become bound to the cellular particles. This interaction takes place in the vicinity of the cellular particles, and normally in or on the particles themselves. The paramagnetic metal compound so formed is thus fixed by the cellular particles, which are thereby rendered magnetic and separable magnetically. Thus, for example, it is possible to rely upon the fact that paramagnetic metals generally form insoluble phosphates, sulfates and/or sulphides. If a compound convertible by the enzymes present in the cellular particles into a phosphate, sulphate, or sulphide is introduced into the aqueous medium containing the paramagnetic metal and the cellular particles, the enzymes of the latter cause the formation of phosphate, sulphate or sulphide ions in their vicinity. These ions then react with the ions of the paramagnetic metal with the formation of an insoluble phosphate, sulphate or sulphide. This insoluble salt is formed in or on the cellular particles and thus is fixed to them. This reaction relies on the paramagnetic metal being initially in the form of an ion, which is very often the case. If it is not in the form of an ion, it must, of course, be converted into an ion if this type of fixing procedure is to be adopted. Any procedure, however, which causes the paramagnetic metal to become fixed, e.g. by formation of an insoluble compound, to the cellular particles may, however, be used.

A particularly convenient way of operating the new process, especially useful where the paramagnetic ions to be separated are uranium ions, consists in adding an organophosphate compound, such as, e.g. a glycerophosphate, to the aqueous medium. The phosphatase normally present in the surface of the cellular particles brings about hydrolysis of the glycerophosphate (or other organophosphate) to glycerol and inorganic phosphate ion. The latter reacts with the uranium ions on the surface of the cellular particles with the formation of insoluble uranium phosphate which thus becomes fixed to the cellular particles.

Micro-organisms which cleave organic sulphate substances can also be used in this way, e.g. strains of Pseudomonas which cleave aryl and alkyl sulphates with secretion of cellsurface-associated sulphates. Such microorganisms can be used in the presence of organic sulphates to precipitate any metal ions present which form insoluble sulphates onto the surface of the organism in a similar way to that described above for the phosphate route.

A third possibility is to use micro-organisms that form hydrogen sulphide, e.g. the Desulphovibrio group of organisms which reduce sulphate to sulphide. In the presence of sulphate ions such microorganisms have a relatively high concentration of sulphide at their cell wall and this causes precipitation of any metal ions which form insoluble sulphides on the cell surface.

It is, of course, essential to the new process that an appropriate type of cellular particles, normally a microorganism, is used. Not all microorganisms possess the desired property, but a wide variety do and it is a simple matter by preliminary experiment to determine which microorganisms possess the ability to bind the metal to the desired degree. This involves simply mixing a culture of the microorganism to be tested with a sample of the aqueous medium from which the metal is to be separated and the compound which is to be converted by the microorganism into a product which interacts with the metal, allowing the mixture to stand so that the metal may interact with the said product and become fixed by the microorganisms, and then separating the latter and determining by standard analytical techniques whether substantially all of the metal has become attached to them.

The microorganisms used are readily available commercially from the usual Collections. Species which have been found satisfactory for use in the new process include *Bacillus subtilis* and *Candida utilis*.

Before the metal-containing medium is treated in accordance with the new process, it may be necessary to adjust its composition so that it is compatible with the efficient operation of the process. In particular, it is essential that the pH of the medium be brought to a value within a range compatible with the desired interaction between the cellular particles, the paramagnetic metal, and the compound which mediates the binding of the latter to the former. Such adjustment may be effected by addition of appropriate acids and/or bases which will not interfere with the process. Readily available acids and bases such as hydrochloric acid and sodium hydroxide are suitable.

The aqueous medium containing the paramagnetic ions is then mixed with a culture of appropriate cellular particles. Usually, the cellular particles are bacterial or yeast cells which have been found by experiment to possess the property of binding the metal ions which are to be separated in the manner already described. After culture in known manner, preferably so as to maximize production of the desired enzyme, the microorganism is added to the aqueous medium. The amount of the culture required depends on the volume of medium to be processed and the optimum quantity, i.e. the minimum quantity consistent with achieving the desired low level of the metal, can easily be found by simple experiment. As a general rule, it has been found suitable to use about $10^{10}$ to $10^{13}$ cells per liter of medium to be processed.

The paramagnetic ions are normally taken up by the cellular particles within a period of a few seconds to 3 days at ambient temperature. The optimum period, i.e. the minimum period after which substantially complete absorption has taken place, may easily be determined by simple experiment.

The mixture of aqueous medium and cellular particles to which the paramagnetic ions have become bound is then subjected to high gradient magnetic separation in known manner. Suitable apparatus is known and has been described in the literature. In general, a magnetisable surface, e.g. of magnetizable stainless steel wool, is placed in an intense magnetic field which causes the surfaces of the steel wool to be magnetised. The powerful magnets required for this purpose are commercially available. The maximum practical throughput depends on the intensity of the magnetic field and the latter should therefore be as high as is reasonably practicable having regard to cost considerations and the desired rate of throughput. A field of about 5 Tesla is, for example, often suitable. The aqueous medium and the cells with the metal bound thereto are passed in contact with the magnetised steel wool, and the latter extracts the cellular particles having the metal bound thereto.

In order to ensure that the cellular particles with the bound paramagnetic ions become held by the magnetised steel wool or other magnetic collector, it is essential to ensure that the suspension of magnetic cellular particles is passed in contact with the magnetised material sufficiently slowly for the magnetic fixing to take place. The maximum permissible velocity of circulation of the magnetised particles should not be higher than the calculated magnetic velocity of the magnetic particles. The appropriate maximum velocity of circulation can be found by simple experiment or calculated in ways previously described in the literature.

When a sufficiently large amount of the cellular particles carrying the metal to be separated has been deposited on the magnetized surface, the particles are removed. This may be done by, for example, simply shutting off the magnetic field so that the particles cease to adhere to the surface, or by removing the surface from the field, which has the same effect. The surface may be arranged so as to move continuously through the magnetic field so that the desired metal is continually deposited thereon in the field and then removed from the no longer magnetic surface outside the field.

Because the advantages of the new process are most conspicuous in the treatment of large volumes of aqueous media containing only small concentrations of the metal to be recovered, it is particularly useful to operate the process continuously. The aqueous metal-containing effluent or other medium to be processed is continuously mixed with metered amounts of an appropriate culture of the microorganism used to bind the metal. The mixture is aged for an appropriate period to allow the metal to be fixed by the cells, and the cellular suspension is then subjected to high gradient magnetic separation. The latter is operated so that the magnetisable material continuously moves into an intense magnetic field while the surface is in contact with the aqueous medium, and then out of the field so that particles deposited on the surface may be easily removed and collected.

The following Example illustrates the invention.

EXAMPLE

*Bacillus subtilis* or *Candida utilis* was grown in shake flasks (200 ml) rotated at 150 rpm in a nutrient medium based on those described by McAskie and Dean (Environmental Technology Letters (1984), 5 pp 177-186 and J. Gen. Microbiol. (1984) 130 pp. 53-62). *Bacillus subtilis* was cultured at 37° C. and *Candida utilis* at 30° C. The cells were harvested at mid-log phase (75% of full development) and separated from the culture medium by centrifugation at 9000 rpm for 40 minutes. They were then resuspended in 0.9% saline to half the original volume. The cells could be stored in this condition at +2° C.

To operate the process, the cell suspension was centrifuged at 9000 rpm for 40 minutes and the cells were then resuspended in MOPS [3-(N-morpholino)propane sulfonic acid] buffer containing glycerophosphate at a concentration of $3.7 \times 10^{-3}$ at the rate of $10^{10}$ to $10^{13}$ cells per liter of buffer. Uranium was added (as the acetate) to a final concentration of 1000 ppm uranium in the liquid medium. The mixture was then made up to one litre with demineralised water and the pH was adjusted to 7 with 2N sodium hydroxide solution. Toluene was then added as a preservative at a rate of 1 drop per ml of suspension, and the mixture was shaken at 20° C. for 18 to 20 hours. During this time the uranium becomes fixed to the suspended cells, and the cells gain in weight.

The separation of the uranium-bearing cells may be effected in an apparatus as shown diagrammatically in the accompanying drawing. The cryostat comprises a superconducting magnet incorporating a refrigerator system which maintains the radiation shield surrounding the coil at 38° K. This feature avoids the use of a liquid nitrogen jacket, thus reducing the overall size of the cryostat and making it possible to obtain high magnetic fields (up to 8 Tesla) over a large volume of the magnet's room temperature bore. Furthermore, very low liquid helium boil-off is achieved (80 cm$^3$ per hour).

The canister is made of Perspex ® and consists of a cylindrical section containing the magnetic matrix and a conical end section to minimise particle settlement on the canister walls. A brass screw cap fits the top of the canister which is positioned vertically in the region of maximum magnetic field. The canister has an inside diameter of 58 mm and an effective length of 160 mm.

Stainless steel wire mesh having a fibre diameter of about 150 μm was used as the matrix material. 260 g of this was packed into the canister, which corresponds to a packing density of 8% by volume.

As shown in the drawing, the direction of the applied magnetic field is parallel to the direction of the flow. The "dead volume" of the system is also shown in the drawing. In batch work, the fluid in the dead volume is an important factor in producing dilution of the magnetic and non-magnetic cells and, if this is to be minimised, the dead volume needs to be accurately known.

The bacteria obtained as described above and concentrated by centrifugation were mixed with a 0.1% saline solution and hand shaken. The system dead volume was filled with saline and with valve A closed the suspension was added to the feed vessel. Then, with the applied field at 5 Tesla, valve B was opened followed immediately by valve A. Valve B has been calibrated to give the required linear velocity through the matrix. There is a small change in the velocity with the pressure head but this amounted to not more than a change of 5% in velocity. The cells which were not captured by the matrix were collected when the cells began appearing in valve B. When the feed suspension had all passed valve A the feed vessel was filled with saline until all the feed suspension had passed completely through the system and there were no fluidised cells left in the system apart from those held magnetically on the matrix. Valve B was then closed and the applied magnetic field was reduced to zero. Valve B was opened wide allowing a strong flow of water at pH 7 to pass through the system from the feed vessel. The cells which were washed out were collected. A high speed centrifuge was used to de-water the separation products.

It was assumed that the uranium was adsorbed by the cells in the form of $UO_2^+$ ions. By comparing the susceptibilities of uranite ($UO_2$) and of the separated particles, the uranium contents of the cells can be calculated.

For *B. Subtilis*: the U content/cm$^3$ was calculated to be 0.73 g.

For *C. Utilis*: the U content/cm$^3$ was calculated to be 0.08 g.

Assuming a bulk density of 1.2 gm/cm$^3$ for the bacterial, these figures correspond to uranium uptake by *C. Utilis* and *B. Subtilis* of 6.7% and 61% of their wet body weights respectively.

This experiment was carried out under laboratory conditions. In industrial use, the concentration of the metal to be separated would probably be significantly lower and the contact time much less.

We claim:

1. A process for the separation of a paramagnetic metal from an aqeuous medium containing said paramagnetic metal in the form of ions which comprises contacting said medium with cellular particles having enzymatic activity in the presence of a compound which is enzymatically converted by said particles into an ion which forms a water-insoluble salt with the paramagnetic ions, said salt becoming bound by said particles, and then separating the particles having the paramagnetic metal salt bound thereto magnetically from said aqueous medium.

2. A method according to claim 1, in which said medium is contacted with said cellular particles in the presence of an organophosphate compound which is hydrolyzed by phosphatase present in said particles with formation of phosphate ions which form an insoluble phosphate with said paramagnetic ions, and said insoluble phosphate is bound by said particles.

3. A method according to claim 2 in which said organophosphate is a glycerophosphate.

4. A method according to claim 1 in which said cellular particles are particles of a bacterium or yeast.

5. A method according to claim 4 in which the said particles are of *Bacillus subtilis* or *Candida utilis*.

6. A method according to claim 1 in which said paramagnetic metal is uranium.

7. A method for the separation of uranium from an aqueous medium containing ions of uranium which comprises contacting said medium with bacterial having phosphatase activity in the presence of a glycerophosphate which is converted by said bacteria into a phosphate which interacts with said uranium ions and causes said to become bound to said bacteria in the form of a uranyl phosphate, and then separating the bacteria having the uranium bound thereto from the aqueous medium by high gradient magnetic separation.

* * * * *